United States Patent [19]

Kajiwara

[11] Patent Number: 5,309,137
[45] Date of Patent: May 3, 1994

[54] MOTOR CAR TRAVELING CONTROL DEVICE

[75] Inventor: Yasuya Kajiwara, Hyogo, Japan

[73] Assignee: Mitsubishi Denki Kabushiki Kaisha, Tokyo, Japan

[21] Appl. No.: 835,411

[22] Filed: Feb. 14, 1992

[30] Foreign Application Priority Data

Feb. 26, 1991 [JP] Japan ............................ 3-030606
Apr. 2, 1991 [JP] Japan ............................ 3-069847

[51] Int. Cl.⁵ .................... G08G 1/16; B60Q 1/00; H04N 7/18
[52] U.S. Cl. ................................ 340/436; 340/903; 348/148; 348/170
[58] Field of Search ............... 340/436, 435, 903, 901, 340/961, 988, 990, 995; 358/105, 126, 125

[56] References Cited

U.S. PATENT DOCUMENTS

| | | | |
|---|---|---|---|
| 4,621,705 | 11/1986 | Etoh | 340/903 |
| 4,872,051 | 10/1989 | Dye | 340/436 |
| 4,926,170 | 5/1990 | Beggs et al. | 340/903 |
| 4,926,346 | 5/1990 | Yokoyama | 364/518 |
| 5,023,712 | 6/1991 | Kajiwara | 358/105 |

FOREIGN PATENT DOCUMENTS

| | | |
|---|---|---|
| 3642196 | 6/1988 | Fed. Rep. of Germany . |
| 400698 | 9/1990 | Fed. Rep. of Germany . |
| 60-261736 | 12/1985 | Japan . |
| 2202104 | 2/1988 | United Kingdom . |

*Primary Examiner*—Donnie L. Crosland
*Attorney, Agent, or Firm*—Sughrue, Mion, Zinn, Macpeak & Seas

[57] ABSTRACT

A motor car travelling control device which measures the distance between a first car and a second car while tracking the image of the second car. When the second car changes its travelling lane, the control device informs the driver of the first car and causes the first car to maintain its present speed. The motor car travelling control device includes an inter-cars distance detector, of the image tracking type, for measuring the distance between a first car and a second car. The control device also includes a lane change detector, a speed controller and a lane change informer. When the second car changes its travelling lane, the lane changes informer informs the driver of the first car and causes the first car to maintain its present speed.

3 Claims, 5 Drawing Sheets

MOTOR CAR TRAVELING CONTROL DEVICE

BACKGROUND OF THE INVENTION

1. Field of the Invention

This invention relates to a motor car traveling control device for controlling the traveling of a motor car on the basis of a tracking type inter-cars distance sensor with a lane change detecting function which measures the distance between a first car on which the sensor is mounted and a second car traveling ahead of it, and detects the lane change of the second car.

2. Description of the Background Art

A sensor for detecting the distance between a first car and a second car ahead of it (hereinafter referred to as "an inter-cars distance sensor", when applicable) has been disclosed, for instance, by Japanese Patent Unexamined Published Application Sho-61-139715. A device for tracking the image of a car ahead has been disclosed, for instance, by Japanese Patent Examined Published Application Sho-60-33352.

FIG. 5 shows the arrangement of the conventional intercars distance sensor. In FIG. 5, reference characters 1R and 1L designate optical systems, namely, lenses; 2R and 2L, twodimensional image sensors; 3, a car ahead the distance from which is to be measured; 6R and 6L, amplifiers; 7R and 7L, analog-to-digital (A/D) converters; 8R and 8L, memories; and 9, an arithmetic processing unit.

The operation of the inter-cars distance sensor will be described. A pair of the image sensors 2R and 2L arranged horizontally or vertically pick up images through the lenses 1R and 1L. The image signals representing the images thus picked up are applied through the amplifiers 6R and 6L to the A/D converters 7R and 7L, respectively, where they are converted into digital data. The digital data are stored in the memories 8R and 8L, respectively.

The arithmetic processing unit 9 makes access to the memories 8R and 8L for image data, to perform arithmetic operations. The arithmetic operations are such that a pair of images are shifted sequentially for correlation. That is, the inter-cars distance can be obtained according to the principle of trigonometrical measurement by using the amount of shift provided when the two images agree best with each other. In the case of FIG. 6, the distance $R_0$ from a car 3 ahead can be calculated from the following equation:

$$R_0 = L_0 \times f/C$$

where $L_0$ is the base length which is the distance between the optical axes of the two lenses 1R and 1L, f is the focal length of the lenses 1R and 1L, and C is the amount of shift, being equal to the sum of A and B (C=A+B).

With regard to the tracking the object, the device for tracking the image of a car ahead has been disclosed by Japanese Patent Examined Published Application Sho-60-33352. With the device, a window is set in an image displaying screen to track the image of an object to be tracked. With an image signal representing the image in the window as a reference signal, from the image signal obtained upon a slight time has lapse, one which agrees best with the reference is selected, and the deviation thereof is detected, and the direction of the image pickup system is moved so that the object comes into the reference position. The above-described operations are sequentially carried out, so that the image of the object can be tracked in such a manner that it is picked up at the reference position.

On the other hand, Japanese Patent Unexamined Published Application Sho-60-261736 has disclosed a motor car traveling control device as shown in FIG. 7. In FIG. 7, reference numeral 20 designates a microcomputer including a CPU 21, a ROM 22, a RAM 23 and an input/output port 24; 25, a radar unit for transmitting and receiving a radio wave to detect the distance between a car and the one ahead (hereinafter referred to as "an inter-cars distance", when applicable); 26, a vehicle speed sensor; 27, a winker switch; 28, a throttle actuator for actuating a throttle valve; and 29, a transmission actuator for actuating a transmission gear.

The operation of the motor car traveling control device thus organized will be described with reference to FIG. 7. The radar unit 25 is operated to detect the inter-cars distance, while the microcomputer 20 controls the throttle actuator 28 and the transmission actuator 29 so that the inter-cars distance thus detected be a predetermined safe inter-cars distance, thereby to control the vehicle speed detected by the vehicle sensor 26. In addition, the microcomputer 20 receives the output signal of the winker switch 27 to detect the fact that the vehicle is going to change the lane, thereby to set a maximum acceleration.

The conventional devices are designed as described above. Hence, in the case of the device for tracking the image of a car ahead, the image of an object held in the window can be tracked, but it is impossible to measure the distance from the object. In the case of the inter-cars distance sensor, it is impossible for it to track the image of a target. In addition, the inter-cars distance sensor suffers from a difficulty that measurement of the distance from a target is adversely affected by the image signals of objects around the target, so that the distance thus measured includes noticeable error.

In the case of detecting the distance from a target and tracking it, the image of an object moving in space is simply tracked. Hence, when, during measurement of the distance between a first car and a second car ahead of it, the second car ahead changes the traveling lane, the measurement is continued as it is; however, the fact that the car ahead has changed the traveling lane cannot be detected. Accordingly, if the first car travels at the same speed, then it may collide with another car traveling on the same lane.

SUMMARY OF THE INVENTION

Accordingly, an object of this invention is to eliminate the above-described difficulties accompanying a conventional motor car traveling control device. More specifically, an object of the invention is to provide a motor car traveling control device which can measure the distance from a target while tracking the image of it, and which, when the target, namely, a motor car ahead changes the traveling lane, detects it and informs the driver of it, and controls the speed to prevent the collision. Another object of the invention is to provide a tracking type inter-cars distance sensor having a lane change detecting function which can measure the distance from a target while tracking the image of it.

A motor car traveling control device according to the invention, comprises: tracking type inter-cars distance detecting unit for detecting the distance between a first car and a second motor car ahead of the first car while tracking the second motor car; lane change detecting unit for detecting when the second car changes the traveling lane; and vehicle speed controlling and lane change informing unit which controls the speed of the first car so that the distance between the first and second cars be a safe distance, and which, in response to a detection signal from the lane change detecting unit, operates to cause the first car to keep the present speed, and informs the driver on the first car of the fact that the second car has changed the traveling lane.

Furthermore, when the second car ahead changes the traveling lane, the inter-cars distance detecting unit sets the window at the front of the first car to perform a distance measuring operation and suspends the tracking of the image of the second car.

A tracking type inter-cars distance sensor having a lane change detecting function according to the present invention, comprises: a pair of image pickup means arranged substantially vertically; window setting means for setting in an image provided by one of said image pickup means at least a first window for tracking an image and a second widow for detecting the changing of a traveling lane in such a manner that said second widow is positioned below said first window; first signal processing means which, with respect to a pair of images provided by said image pickup means, uses said first o window, to measure the distance from an object, the image of which is held in said first window, according to the principle of trigonometrical measurement, and which subjects the images in said window to comparison time-sequentially to detect the image which is best in the result of comparison, thereby to track the image of said object; and second signal processing means which detects a region in said second window which is brighter than the surroundings, and determines, from the movement of said region thus detected, that the changing of a traveling lane has occurred.

According to the present invention, the tracking window is moved in the display screen as tracking a car ahead, while the window, below the tracking window, for detecting the car ahead changing a traveling lane is also moved. Normally, the latter window detects an image representing the traveling lane such as white line of the road. When, however, the car ahead being tracked changes the traveling lane, a region brighter than the surroundings in the window for detecting the lane change is moved relative to the tracking window. Such movement of bright region is detected and determined, so that the changing of the traveling lane of the car ahead is detected.

Furthermore, when the second car ahead changes its traveling lane, it is meaningless to track the image of the car to measure the distance between the first and second cars, and if the measurement is continued, the first car may collide with other cars on the same lane. Therefore, with the device of the invention, when the lane change detecting unit detects when the second car ahead changes the traveling lane, it informs the driver on the first car of the fact that the second car has changed the traveling lane, and operates to cause the first car to keep the present speed.

Moreover, when the window is set at the front of the first car, the image of another car ahead on the same lane as the first car is running may be held in it. In this case, the distance form the car can be measured.

DETAILED DESCRIPTION OF THE PREFERRED EMBODIMENTS

Figure 1:
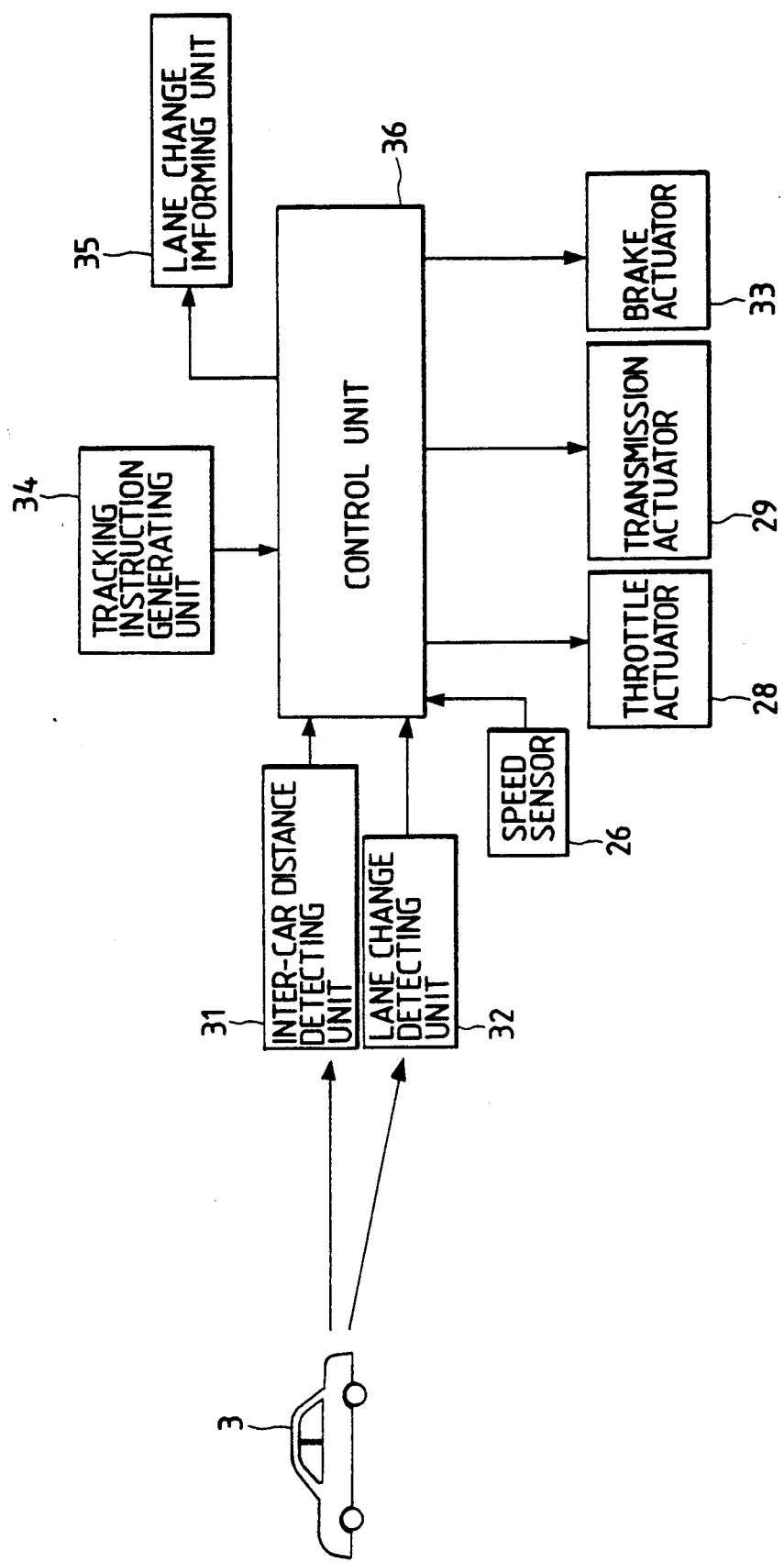
FIG. 1 is an explanatory diagram, partly as a block diagram, showing the arrangement of a motor car traveling control device which constitutes one embodiment of this invention.
Figure 7:
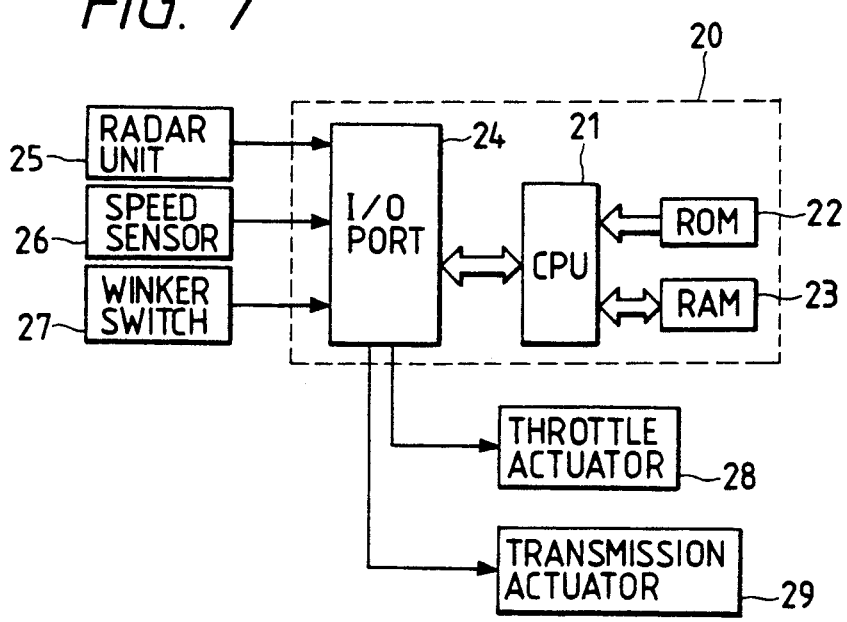
FIG. 7 is a block diagram showing the arrangement of a conventional traveling control device.

One preferred embodiment of this invention will be described with reference to the accompanying drawings. FIG. 1 is an explanatory diagram, partly as a block diagram, showing the arrangement of a motor car traveling control device, the embodiment of the invention. In FIG. 1, reference numerals 26, 28 and 29 designate the same elements as those in FIG. 7.

In FIG. 1, reference numeral 31 designates an inter-car distance detecting unit for detecting the distance a car on which the device of the invention is mounted (hereinafter referred to as "a first car", when applicable) and a car 3 traveling ahead of it (hereinafter referred to as "a second car 3", when applicable); 32, a lane change detecting unit for detecting that the second car 3 changes its traveling lane; 33, a brake actuator for actuating a brake; 34, a tracking instruction generating unit which is externally operated to provide a tracking instruction; and 35, a lane change informing unit for informing a driver of the fact that the second car 3 ahead has changed its traveling lane.

Further in FIG. 1, reference numeral 36 designates a control unit made up of a microcomputer. The input port of the control unit 36 is connected to the inter-cars distance detecting unit 31, the lane change detecting unit 32, the tracking instruction generating unit 34, and the vehicle speed sensor 26, and the output port is connected to the throttle actuator 28, the transmission actuator 29, the brake actuator 33, and the lane change informing unit 35. That is, the control unit 36 receives various detection signals and instruction signals through the input port, and, in response to those signals, provides output signals so as to carry out the traveling control and notification.

In the embodiment, the inter-cars distance detecting unit 31 and the lane change detecting unit 32 are provided as one unit as described later. The lane change informing unit 35 employs light and/or sound to inform the driver of the fact that a car ahead has changed its traveling lane.

The operation of the device thus organized will be described with reference to FIG. 1. First, in order to specify a car 3 ahead, the driver operates the tracking instruction generating unit 34 to provide a tracking instruction. The tracking instruction thus produced is applied to the control unit 36. In response to the tracking instruction, the control unit 36 performs a traveling control operation according to the output signals of the inter-cars distance detecting unit 31 adapted to measure the distance from the second car 3, the lane change detecting unit 32 adapted to detect when the second car 3 has changed its traveling lane, and the vehicle speed sensor 26 adapted to detect vehicle speed, thereby to maintain the distance between the first and second cars at a predetermined safe and correct value.

That is, the control unit 36 controls the throttle actuator 28, the transmission gear actuator 29, and the brake actuator 33, to control the speed of the first car.

When the lane change detecting unit 32 detects that the car 3 has changed its traveling lane, the detection signal is applied to the control unit 36. In response to the detection signal, the control unit actuates the lane change informing unit 35, as a result of which the lane change informing unit 35 outputs an optical or acoustic signal to inform the driver of the car 3 having changed its lane. At the same time, the control unit 36 controls the throttle actuator 28, the transmission actuator 29, and the brake actuator 33 to cause the first car to keep the present speed. In addition, the control unit 36 applies an instruction signal to the inter-cars distance detecting unit 31 to suspend the measurement of distance by tracking, and to set a window for measuring the distance at the front of his car to measure the distance from an object located there.

Figure 2:
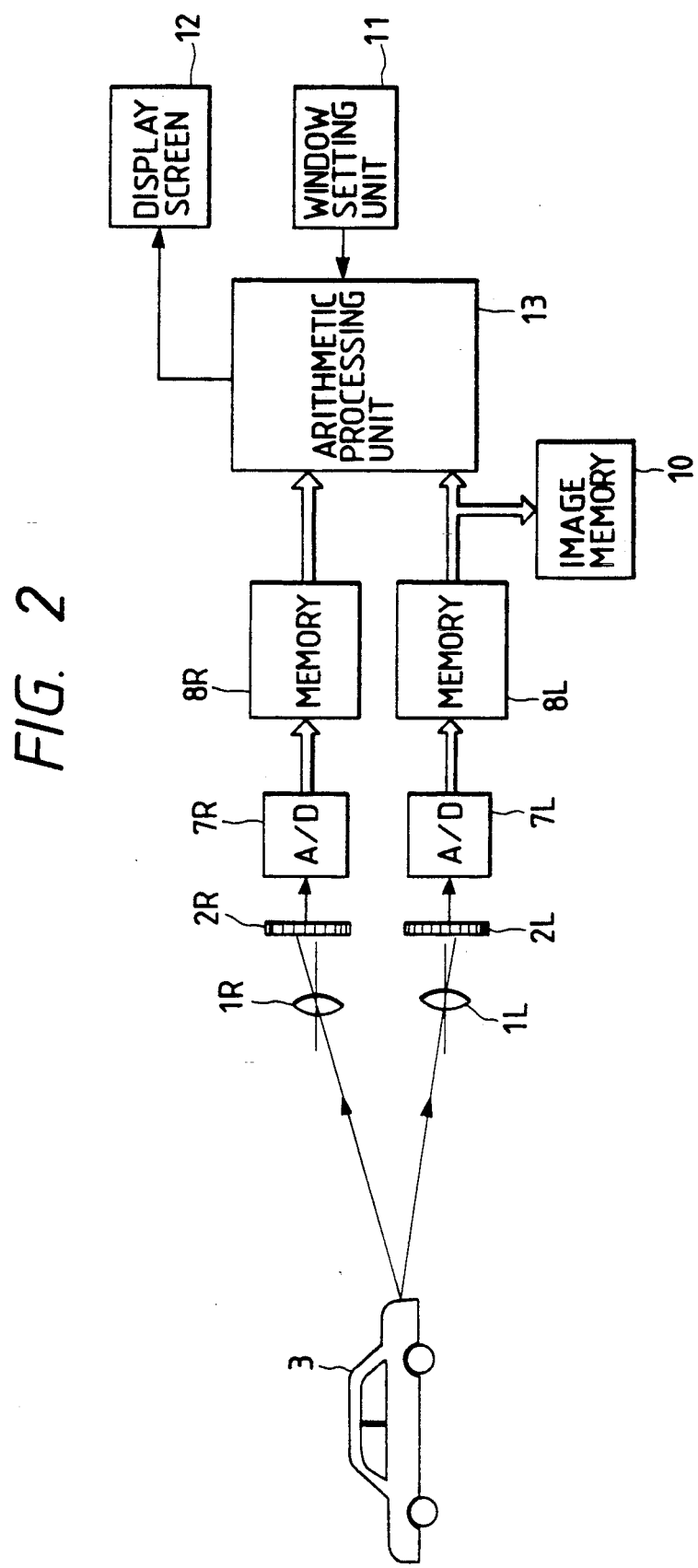
FIG. 2 is an explanatory diagram, partly as a block diagram, showing the arrangement of an image tracking type inter-cars distance sensor in the device shown in FIG. 1 which has a function of detecting when a car ahead changes its traveling lane.
Figure 5:
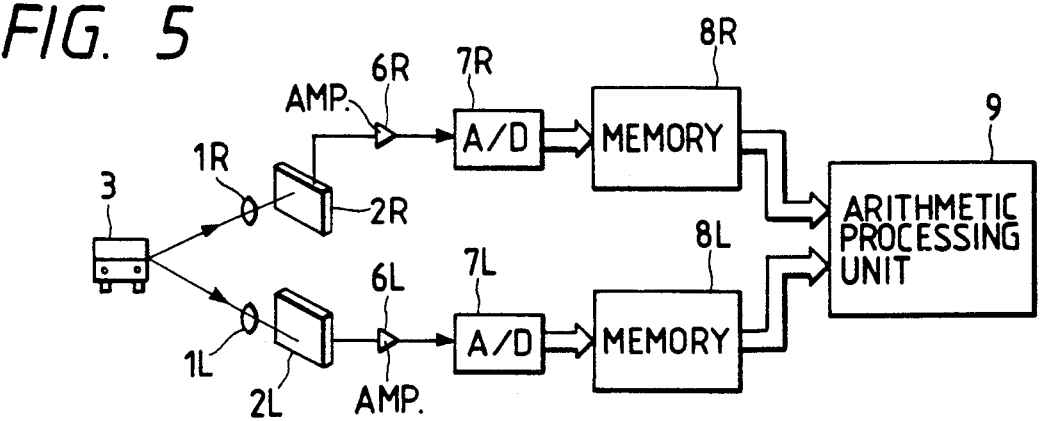
FIG. 5 is an explanatory diagram, partly as a block diagram, showing eh arrangement of a conventional inter-cars distance sensor.

Now, an inter-cars distance sensor capable of detecting that a car ahead changes its traveling lane will be described which is unity made up of the tracking type inter-cars distance detecting unit 31 and the lane change detecting unit 32. The arrangement of the inter-cars distance sensor is as shown in FIG. 2. In FIG. 2, reference characters 1R, 1L, 2R, 2L, 3, 7R, 7L, 8R and 8L designate the same elements as those in FIG. 5 showing the conventional art. Further in FIG. 2, reference numeral 10 designates an image memory; 11, window setting unit for setting a window; 12, a display screen; and 13, an arithmetic processing unit. The arithmetic processing unit 13 performs arithmetic operations according to image signals stored in the memories 8R and 8L, to detect an inter-cars distance $R_0$ and the changing of a traveling lane, and to track the image of a car ahead. The arithmetic processing unit 13 is also connected to the image memory 10 coupled to the memory 8L, the window setting unit 11, and the display screen 12.

An operation of detecting an inter-cars distance, an operation of detecting of a car ahead changing its traveling lane, and an operation of tracking the image of a car ahead will be described with reference to FIG. 2. Images such as those of the car 3 traveling ahead and a white line such as a separate line On the road are applied through the lenses 1R and 1L to the image sensors 2R and 2L, where they are converted into image signals. The image signals are converted into digital signals by the A/D converters 7R and 7L, which are stored in the memories 8R and 8L, respectively. The arithmetic processing unit 13 operates to display the image on the display screen 12 which is formed with the image signal stored in the memory 8L.

The operator operates the window setting unit 11 while watching the image on the display screen 12, to set a window in the display screen at a desired position. More specifically, by operating the window setting unit, the address in the memory 8L which specifies the window is stored in the arithmetic processing unit 13.

Figure 3A:
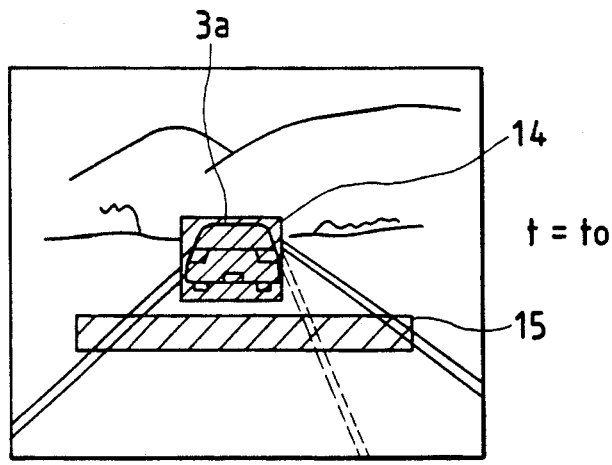
FIGS. 3A to 3C are explanatory diagrams showing images stored in a memory in the inter-cars distance sensor, for a description of the operation of the latter.
Figure 3B:
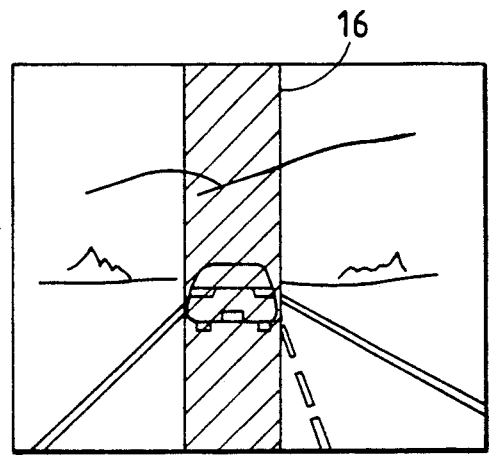
Figure 3C:
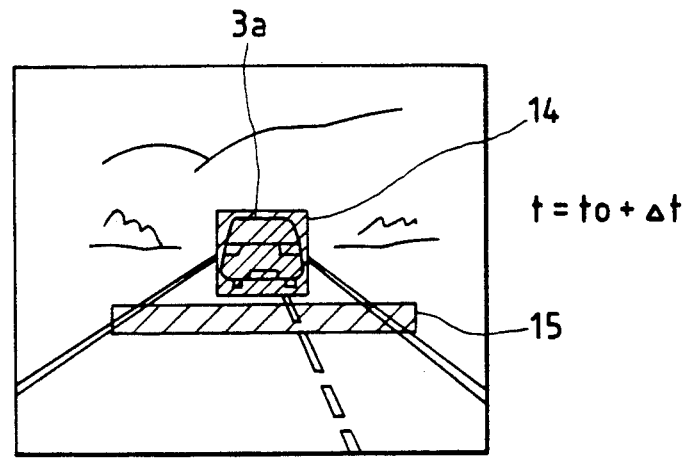

FIGS. 3A to 3C show images formed with the image signals stored in the memories 8R and 8L. More specifically, FIGS. 3A and 3B show the images formed with the image signals in the memories 8L and 8R at the time instant $t=t_0$, respectively, and FIG. 3C, the image formed with the image signal in the memory 8L at the time instant $t=t_0+\Delta t$. In FIG. 3, reference character 3a designates the image of a car traveling ahead; 14, a tracking window, namely, a first window; and 15, a second window for detecting that the car ahead changes its traveling lane. The second window is horizontally elongated and set below the first window 14.

Figure 6:
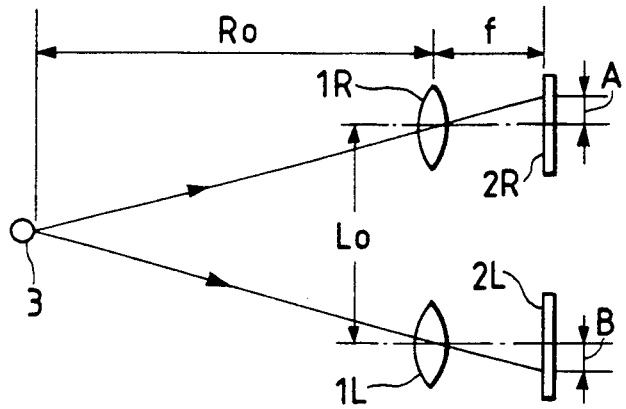
FIG. 6 is an explanatory diagram for a description of the operation of the conventional inter-cars distance sensor.

As shown in FIG. 3A, the image 3a of the second car 3 is held in the first window. The inter-cars distance is measured as follows: Of the area of the image stored in the memory 8R, the region 16 corresponding to the first window 14 is selected. Then, the region 16 is divided into pieces successively each of which corresponds in size to the first window 14 shown in FIG. 3A, and thus divided pieces are shifted, thereby a correlation operation is carried out for each of the pieces. When the image is the best in correlation, the deviation in position between the image held in the first window 14 and that of FIG. 3B is detected. By using the deviation in position, the arithmetic processing unit 13 calculates from the above-described equation the distance $R_0$ from the car 3 ahead corresponding to the image 3a, according to the trigonometrical measurement as shown in FIG. 6.

The second window 15 for detecting a car changing its traveling lane is automatically set by the arithmetic processing unit 13 when the first window 14 is set in the above-described manner. In the second window 15, a part brighter than the surroundings is selected, and it is regarded as the image of a white line corresponding to that of the white line on the road. That is, the bright part thus selected is determined as the image of the white line when it remains there for a predetermined period of time.

The image signal representing the image in the first window 14 used for calculation of the inter-cars distance at the time instant $t=t_0$ is transferred from the memory 8L into the image memory 10 as a reference signal. Then, at the time instant $t=t_0+\Delta t$, namely after a slight time $\Delta t$ has lapse, new images are stored in the memories 8L and 8R. During this period, the first car and the second car 3 are running, and therefore the image (FIG. 3C) at the time instant $t=t_0+\Delta t$ is slightly difference from that at the time instant $t=t_0$ (FIG. 3A).

In the above-described case, the image signal used at the time instant $t=t_0$ is transferred into the image memory 10. Instead of this, the following method may be employed: The image signal is kept in the memory 8L, and the image signal at the time instant $t=t_0+\Delta t$ is stored in the image memory 10 and the memory 8R.

In the image (FIG. 3C) provided at the time instant $t=t_0+\Delta t$, the arithmetic processing unit 13 selects a part by correlation which agrees best with the image at the time $t=t_0$ in the first window 14. In this case, it can be considered that, when $\Delta t$ is small, the amount of movement of the image 3a of the car ahead is also small. Hence, the region to be search is a narrow one including those surrounding the first window at the time instant $t=t_0$.

Thus, the first window 14 is newly set in the part of the image which, at the time instant $t=t_0+\Delta t$, agrees best with the image which was held in the first window 14 at the time instant $t=t_0$, as was described above. In this operation, the second window 15 is also newly and automatically set below the first window 14.

Thereafter, in the same manner, the distance from the car 3 at the time instant $t=t_0+\Delta t$, can be obtained, and the position of the image of the white line in the second window 15 can be detected. By performing these operations continuously, the image 3a of the car 3 ahead can be held in the first window 14; that is, it can be tracked with the window 14.

The second window 15 for detecting the second car changing its traveling lane is provided together with the first window for tracking the image of the car ahead, and these windows 14 and 15 are maintained unchanged in positional relationship. For instance in the case where a car 3 ahead runs on a white line marked on a straight road as shown in FIG. 3A, the image of the white line brighter than the surroundings is detected at the second window substantially just below the image 3a of the car 3. That is, in this case, the ratio of two lanes in width appearing in the screen (hereinafter referred to as "a lane width ratio", when applicable) is smaller than in the case where the car 3 runs in the same lane of the road as shown in FIG. 3A.

The lane width ratio is calculated by the arithmetic processing unit 13, for instance, as follows: In the case of FIGS. 3A or 3C, the arithmetic processing unit 13 detects the position (or X-coordinate) of the image of the white line in the second window, and obtains the lane width ratio from the position thus detected. In this case, a ratio of the right lane to the left lane in width, and a ratio of the left lane to the right lane in width can be obtained; however, it should be noted that the larger of the two ratios is employed as the lane width ratio.

Figure 4A:
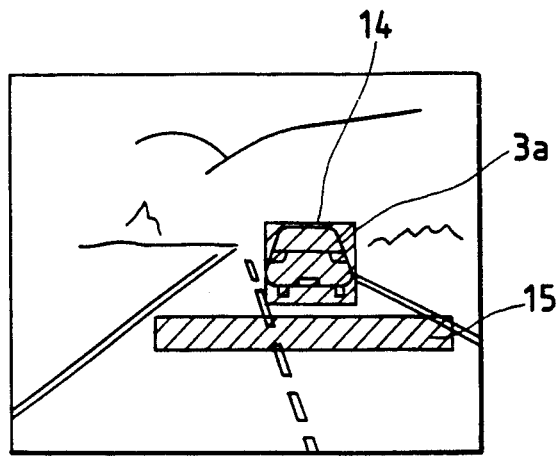
FIGS. 4A to 4C are also explanatory diagrams for a description of the operation of the inter-cars distance sensor.

FIG. 4 shows variety cases of images stored in the memory 8L. In the case where, as shown in FIG. 4A, a car 3 ahead runs in the next lane on the straight road, the image 3a of the car 3 is shifted from the middle to one side (to the right side in this case), and the image of the white line is detected near the middle of the second window. In this case, the lane width ratio is relatively small. The amount of shift of the car image 3a is obtained through the operation of the arithmetic processing unit; that is, the arithmetic processing unit 13 operates to calculate the amount of shift of the first window 14 from the center of the screen to determine the amount of shift of the car image 3a.

Figure 4B:
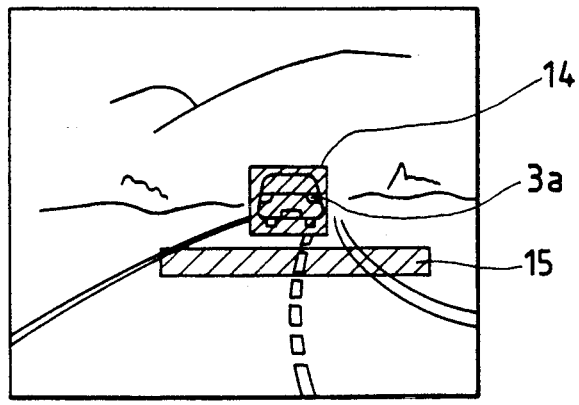

In the case of a curved road, the image of the white line is detected in the second window 15. However, from the fact that, as shown in FIG. 4B, the amount of shift of the image of the car 3 from the center of the screen, and the lane width ratio are relatively large, it can be determined that the car is in the same lane.

Figure 4C:
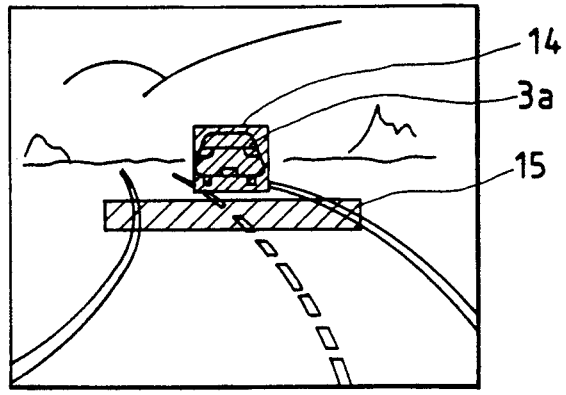

In the case where, as shown in FIG. 4C, the car 3 ahead runs in the next lane, the image of the white line comes in the second window 15. It can be detected from the amount of shift of the car image 3a from the center of the screen and the lane width ratio that the car 3 runs in the next lane.

If, although a second car 3 running ahead of a first car has changed its traveling lane, the first car keeps tracking the second car 3, then other cars on the lane disappear from the screen, and therefore the first car may collide with other; that is, in this case, it is impossible to predict the collision. Accordingly, when the second car 3 running in the same lane as the first car moves to another lane, it is necessary to produce a warning signal to inform the driver of the fact that his car, the first car, may collide with other cars. This requirement is satisfied by the provision of the motor car traveling control device, one embodiment of the invention. That is, in such a case, the device generates a warning signal, and operates to cause the motor car to keep the present speed. In this case, the first window is shifted to the front of the his car, for instance, the center of the screen to measure the distance from an object there; however, in this case, the tracking of the image may be suspended.

As was described above, the motor car traveling control device of the invention is so designed that the distance a first car and a second car ahead of it is measured while the image of the second car being tracked, and it is detected when the second car changes its traveling lane. When the second car changes the lane, the device suspends the tracking of the image of the car, and causes the first car to keep the present speed, and informs the driver of the fact that the second car ahead has changed the lane. Hence, with the device, the collision of the first car with other cars ahead can be avoided as much.

When the tracking of the image of the car ahead is suspend-ed, the first window for detecting the inter-cars distance is set on the image screen at the front of said first car. Hence, in this case, the distance from an object located in front of the first car can be measured, and the traveling of the first car is improved in safety as much.

What is claimed is:

1. A motor car traveling control device comprising:
   inter-car distance detecting means for detecting the distance between a first car and a second car ahead of said first car while tracking said second car;
   lane change detecting means for detecting when said second car changes a traveling lane; and
   vehicle speed controlling and lane change informing means which automatically controls a speed of said first car according to an output of said inter-car distance detecting means to maintain a safe distance between said first and second cars, and which, in response to a detection signal from said lane change detecting means, operates to cause said first car to maintain a present speed, and informs the driver of said first car that said second car has changed traveling lane.

2. A device as claimed in claim 1, wherein said inter-car distance detecting means comprises:
   image pickup means for detecting a pair of images used for tracking said second car, said inter-car distance detecting means positioning an image tracking and distance measuring window with respect to said pair of images provided by said image pickup means, and, when said second car changes traveling lane, setting said window in front of said first car to perform a distance measuring operation and suspending the tracking of the image of said second car.

3. An image tracking type inter-car distance detecting device having a lane change detecting function, said device comprising:
   a pair of image pickup means, arranged substantially vertically, for detecting images used for tracking inter-car distances;

window setting means for setting, in an image provided by one of said image pickup means, at least a first window for tracking an image and a second window for detecting a change in a traveling lane in such a manner that said second window is positioned below said first window;

first signal processing means which, with respect to a pair of images provided by said image pickup means, uses said first window, to measure a distance from an object, the image of which is held in said first window, according to a principle of trigonometrical measurement, and which time-sequentially compares the images in said first window in order to detect the image in said first window that corresponds to said image of said object, thereby tracking the image of said object; and second signal processing means which detects a region in said second window which is brighter than a surrounding, and determines, from movement of said region thus detected, that a change in a traveling lane has occurred.

* * * * *